United States Patent
Hanson et al.

(10) Patent No.: US 11,691,511 B2
(45) Date of Patent: Jul. 4, 2023

(54) REDUNDANT VEHICLE CONTROLS BASED ON USER PRESENCE AND POSITION

(71) Applicant: Ford Global Technologies, LLC, Dearborn, MI (US)

(72) Inventors: Ryan Edwin Hanson, Livonia, MI (US); Pietro Buttolo, Dearborn Heights, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 17/228,663

(22) Filed: Apr. 12, 2021

(65) Prior Publication Data

US 2022/0324329 A1    Oct. 13, 2022

(51) Int. Cl.
　　*B60K 37/06*　　(2006.01)
　　*B60W 40/08*　　(2012.01)
　　*B60W 50/10*　　(2012.01)
　　*B60W 10/20*　　(2006.01)
　　*G06F 3/044*　　(2006.01)

(52) U.S. Cl.
　　CPC ............ *B60K 37/06* (2013.01); *B60W 10/20* (2013.01); *B60W 40/08* (2013.01); *B60W 50/10* (2013.01); *G06F 3/0446* (2019.05); *B60K 2370/143* (2019.05); *B60W 2540/223* (2020.02)

(58) Field of Classification Search
　　CPC .............. B60K 37/06; B60K 2370/143; B60K 2370/146; B60K 2370/21; B60K 2370/48; B60K 2370/741; B60K 37/04; B60W 10/20; B60W 40/08; B60W 50/10; B60W 2540/223; G06F 3/0446
　　See application file for complete search history.

(56) References Cited

U.S. PATENT DOCUMENTS

RE46,828 E　　5/2018　Spillane et al.
2007/0017726 A1*　1/2007　Takemura ............... B60R 22/46
　　　　　　　　　　　　　　　　　　　　　　280/806

(Continued)

OTHER PUBLICATIONS

Mazda of Lodi, Learn These Features to Use Your Mazda Push Button Start System, May 16, 2016 (Year: 2016).*

(Continued)

*Primary Examiner* — James J Lee
*Assistant Examiner* — Andrew Sang Kim
(74) *Attorney, Agent, or Firm* — Frank Lollo; Eversheds Sutherland (US) LLP

(57) ABSTRACT

Redundant vehicle controls based on user presence and position are disclosed herein. A method can include determining a presence and a position of a driver in a sensing zone of a vehicle using a sensor platform integrated into the vehicle. The sensing zone is associated with a primary driving interface of the vehicle. Determining when the position of the driver indicates that the driver is not in a fully-seated position relative to a driver's seat of the vehicle, and that the vehicle is in a non-seated drive mode where the driver is permitted to operate the vehicle while not being in the fully-seated position. Activating a secondary driving interface of the vehicle when the driver is not in a fully-seated position and the vehicle is in the selected driving mode. The secondary driving interface can be used in combination with the primary driving interface.

20 Claims, 7 Drawing Sheets

(56) References Cited

U.S. PATENT DOCUMENTS

| | | | |
|---|---|---|---|
| 2012/0193480 A1* | 8/2012 | Carreon | B64F 1/326 244/137.1 |
| 2015/0046032 A1 | 2/2015 | Clarke et al. | |
| 2015/0328985 A1* | 11/2015 | Kim | B60W 50/16 180/272 |
| 2017/0334452 A1* | 11/2017 | Abe | B60W 10/04 |
| 2018/0126992 A1 | 5/2018 | Lu et al. | |
| 2019/0054927 A1* | 2/2019 | Hayakawa | B60W 30/06 |

OTHER PUBLICATIONS

Kami Buchholz, "Ford Gives 2019 Raptor Smarter Shocks, New Trail Control Electronics", SAE Mobilus, Jun. 11, 2018, 3 pages.
Bernard Harper, "Audi Unveils AI: Trail Quattro Electric Off-Roader Concept", Green Car Congress, BioAge Group, LLC, Sep. 11, 2019, 16 pages.

* cited by examiner

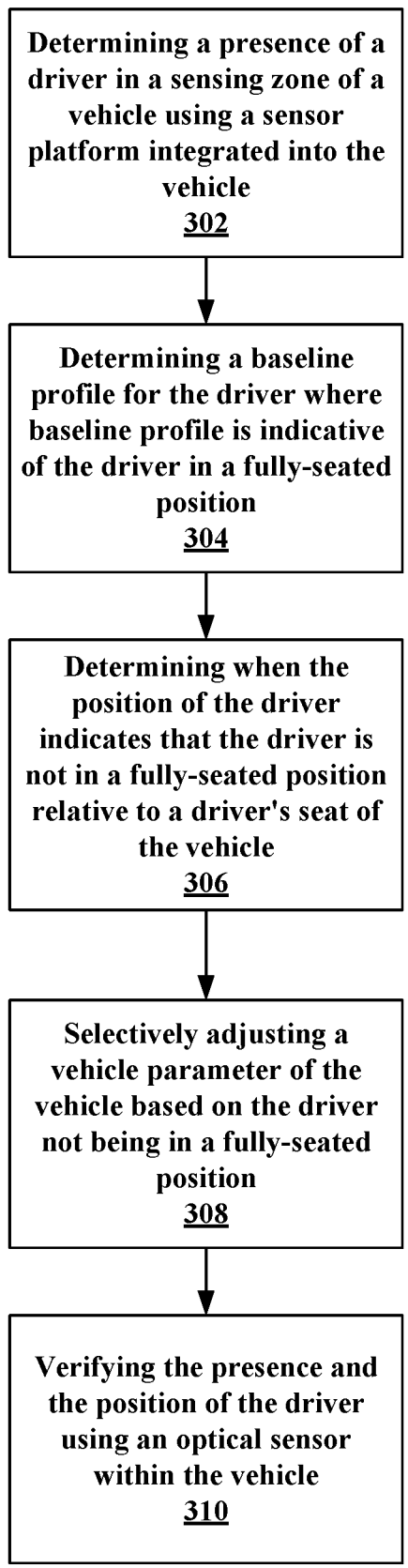
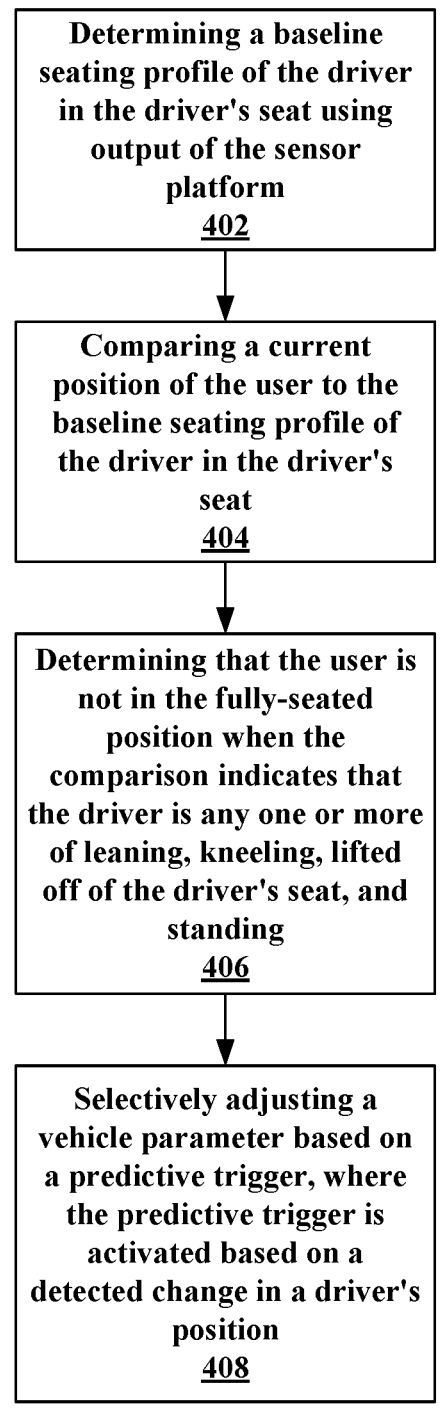
FIG. 3
FIG. 4

REDUNDANT VEHICLE CONTROLS BASED ON USER PRESENCE AND POSITION

BACKGROUND

There exist special use cases in off-road driving where terrain and or maneuvers require a driver to be in a position other than fully-seated to maintain the safety of both the vehicle and driver. Thus, in some instances, a driver may operate a vehicle in a non-seated position. For example, the driver of an off-road capable vehicle may drive the vehicle while in a non-fully-seated position such as standing, kneeling, or leaning. The driver may find this position to be advantageous in order to obtain a better view of certain parts of the vehicle during off-roading. For example, when the vehicle is being driven over boulders, the driver may wish to determine if there is sufficient clearance between the vehicle and a boulder or another adjacent object. In these positions, the driver may lose access to primary vehicle controls such as the steering wheel and/or gas and brake pedals.

Sometimes vehicle doors and/or roof sections may be removed, and this may result in the driver not being detected as present, causing the termination and/or engagement of vehicle features that could hinder the driver's ability to operate the vehicle. These vehicle features include but are not limited to the following the engagement of auto-park (shift to Park on driver exit), secure idle where gear shifting is rendered unavailable until a valid key is returned to the vehicle interior, hill assist where the vehicle brake is engaged to prevent backsliding during hill climbing events, traffic jam assist where the vehicle applies braking force and allows the vehicle to move up a given distance from the vehicle ahead of them, and trail control (a low-speed cruise control for trail and rock climbing driving)—just to name a few.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 3 is a flowchart of an example method of the present disclosure for driver presence and position detection.

FIG. 4 is a flowchart of another example method for determining when the position of the driver indicates that the driver is not in the fully-seated position.

DETAILED DESCRIPTION

Overview

Figure 1:
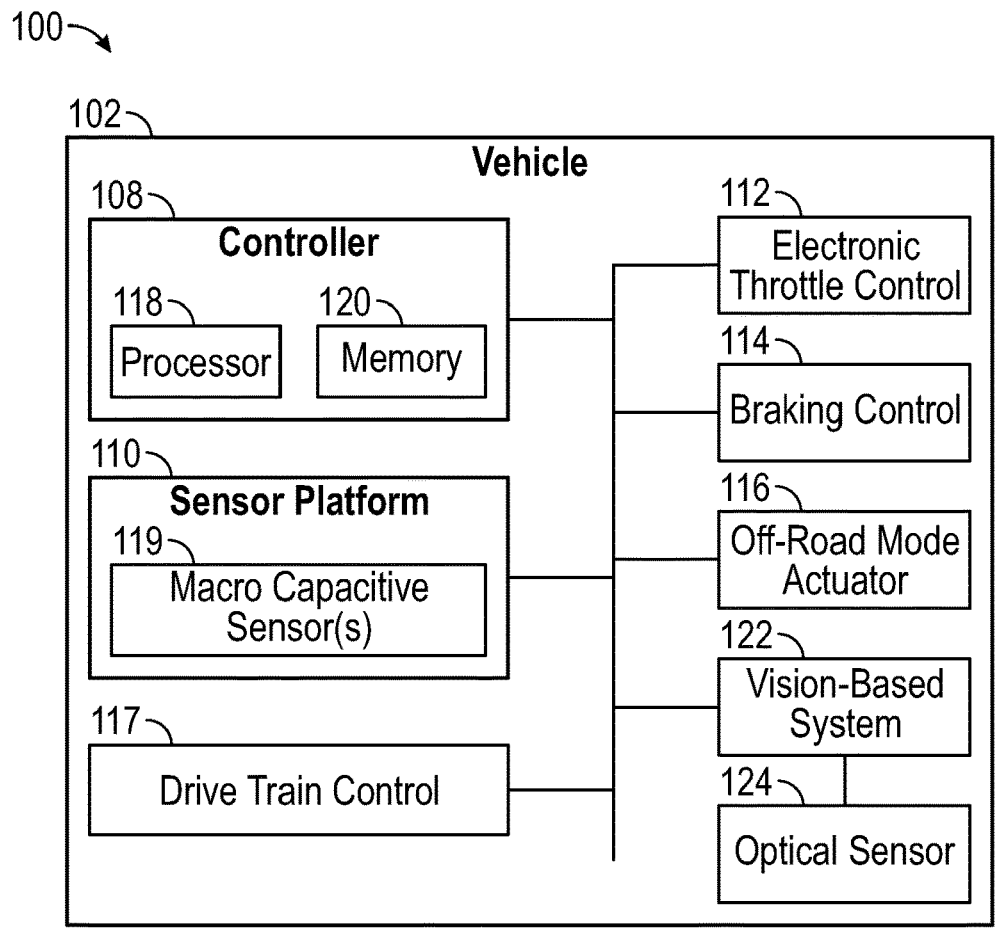
FIG. 1 illustrates an example architecture where the systems and method of the present disclosure may be practiced.
Figure 1:
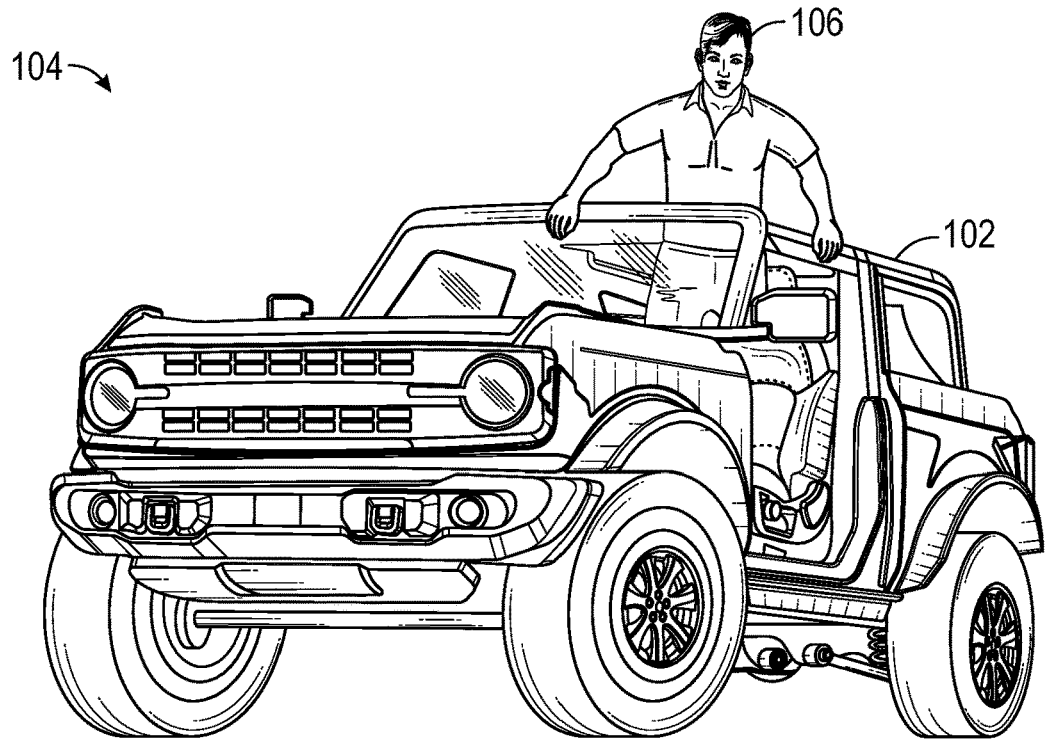

The present disclosure generally pertains to driver presence and position sensing, as well as selectively adapting vehicle parameters, functions, and/or operations based on a sensed driver position. In more detail, the present disclosure involves systems and methods that detect an operator or driver of a vehicle being present, as well as their position, even if not seated, through the use of sensor(s). These sensor(s) can include one or more macro-capacitive sensors. Other example sensors or sensing methodologies/mechanisms can be used to determine driver presence, such as cameras (images/video), ultrasonic, LiDAR (light detection and ranging), ultra-wideband radar, passive entry/passive start, phone-as-a-key, and so forth. In sum, activation and/or adaptation of a vehicle for redundant controls could be done as a result of current driver presence detection methods and/or vehicle mode selection, given the driver can be positively determined to be in the vehicle using any of the methods disclosed herein.

The systems and methods can enable specialized vehicle control during unique conditions related to special use cases (user experiences "UX") in off-road driving, for example. These special use cases may include instances where an ideal driver position may not be a fully-seated position, such as during tight maneuvering conditions or other similar off-road paradigms. These non-fully seated positions may allow a driver to visualize their surrounding environment in ways that would be difficult or impossible if the driver were in a fully-seated position. Other alternative driver positions may include the driver leaning out a window or door frame of the vehicle, lifting up off the seat, kneeling on the seat, or even standing up in the vehicle.

While traditional methods of driver presence detection exist, these methods fail to definitively determine the driver's position in the vehicle. These traditional detection systems may include using an occupant classification sensor, which is a direct method of detection that involves measuring the output of a weight-based sensor placed in the bottom of a seat. For example, the sensor measures air pressure from a bladder placed in the seat bottom. A seat belt sensor is an example of an indirect method that involves sensing a closed contact of a seat belt connector. Another example includes a door ajar sensor, which is another indirect sensing method that detects door closure combined with the vehicle ignition status to infer the driver's position as inside/outside.

Other example technologies that can be used to detect driver presence include, but are not limited to driver attention monitoring, which is a direct method that uses a camera to focus on a driver's location (such as driver's seat) and evaluate that location to determine if the driver is focused on the road. A thermal sensor can be used to sense driver body temperature at a specific location of focus. An ultrasonic sensor can be used to sense objects or reduction of area in a zone of a seat.

In accordance with the present disclosure, the systems and methods disclosed herein can include a sensor platform and controller that detect both the presence of the driver (e.g., to check if there a driver in the vehicle or not), as well as a position of the driver relative to a sensing zone of the vehicle. For example, the sensing zone can include a driver's seat area that includes primary controls for the vehicle, such as a steering wheel. The position is indicative of a body posture of the driver relative to the driver's seat in some instances.

Sensors for detecting presence and position can be integrated into any part of the vehicle that is adjacent to or within the sensing zone of the vehicle. For example, one or more sensors can be integrated into the driver's seat or a vehicle frame element such as a vehicle door, an A-pillar, a B-pillar, a dash panel, a screen pillar that surrounds the windshield, and so forth.

Vehicle parameters, functions, and/or operations can be selectively altered based on sensed changes in driver position. For example, when the driver is determined to be fully seated, normal vehicle functions can be enabled. When the driver is determined not to be in a fully-seated position, some aspects of vehicle control may be selectively altered. For example, alterations to vehicle throttle input, and/or braking may be modified. In one example, damping of both acceleration and braking may be realized to prevent the driver from unintentionally accelerating or slowing the vehicle when the driver is not in a fully-seated position. These vehicle operations can also be adjusted when a user selects an off-road actuator such as a switch or button within the vehicle.

The systems and methods herein provide for recognition and protection of an allowable mode of driving of a vehicle by a driver in a non-seated state (e.g., not full-seated). Methods disclosed herein provide for direct driver presence and position detection through the use of macro-capacitive sensor(s). Accurate driver presence detection can be achieved, as well as an accurate position of the driver in a vehicle controls location (referred to as a sensing zone). Driver position sensing can be fine-tuned to detect when the driver is sitting, hunched, leaning, and/or standing in the vehicle. The systems and methods herein also provide enhanced vehicle operation using presence and position detection to limit a search zone for a driver's face on vision-based features.

The present disclosure also provides systems and methods related to redundant vehicle controls in abnormal vehicle operation positions during special operational use cases. Example redundant or secondary vehicle controls/interface can include, but are not limited to, macro capacitive surfaces. A driver can utilize the secondary vehicle control, such as one or more MCS sensors to control speed and torque, alone or in combination with a primary driving interface, such as a steering wheel for controlling direction.

ILLUSTRATIVE EMBODIMENTS

Turning now to the drawings, FIG. 1 depicts an illustrative architecture 100 in which techniques and structures of the present disclosure may be implemented. The architecture 100 can comprise a vehicle 102 in an operating area 104. For example, the vehicle 102 may be operating on off-road terrain. A driver 106 may be motivated to operate the vehicle 102 in both a fully-seated position, as well as any position that is not fully-seated, as illustrated in FIG. 1.

The vehicle 102 generally comprises a controller 108, a sensor platform 110, an electronic throttle control 112, a braking control 114, and an optional off-road mode actuator 116, and a drive-train control 117. The controller 108 can comprise a processor 118 and memory 120 for storing executable instructions, the processor 118 can execute instructions stored in memory 120 for performing any of the driver presence and position detection and response features disclosed herein. Also, the controller 108 can direct signals or messages to each of the electronic throttle control 112, the braking control 114, and/or the drive-train control 117 based on the output of the sensor platform 110. When referring to operations performed by the controller 108, it will be understood that this includes execution of instructions stored in memory 120 by the processor 118.

The sensor platform 110 can include one or more macro-capacitive sensor(s) (MCS) 119 that detect changes in capacitive fields within the sensing zone of the vehicle 102 to determine the presence and the position of a driver in the sensing zone. Individual sensors output signals that are indicative of a rise and fall of capacitive field interference as the driver transitions through its field. An example sensing zone is illustrated and described in FIG. 2. While the use of macro-capacitive sensor(s) 119 has been disclosed, other types of sensors that are capable of detecting the presence and position of a driver of the vehicle can be used such as ultrasonic, LIDAR, and so forth.

Figure 2:
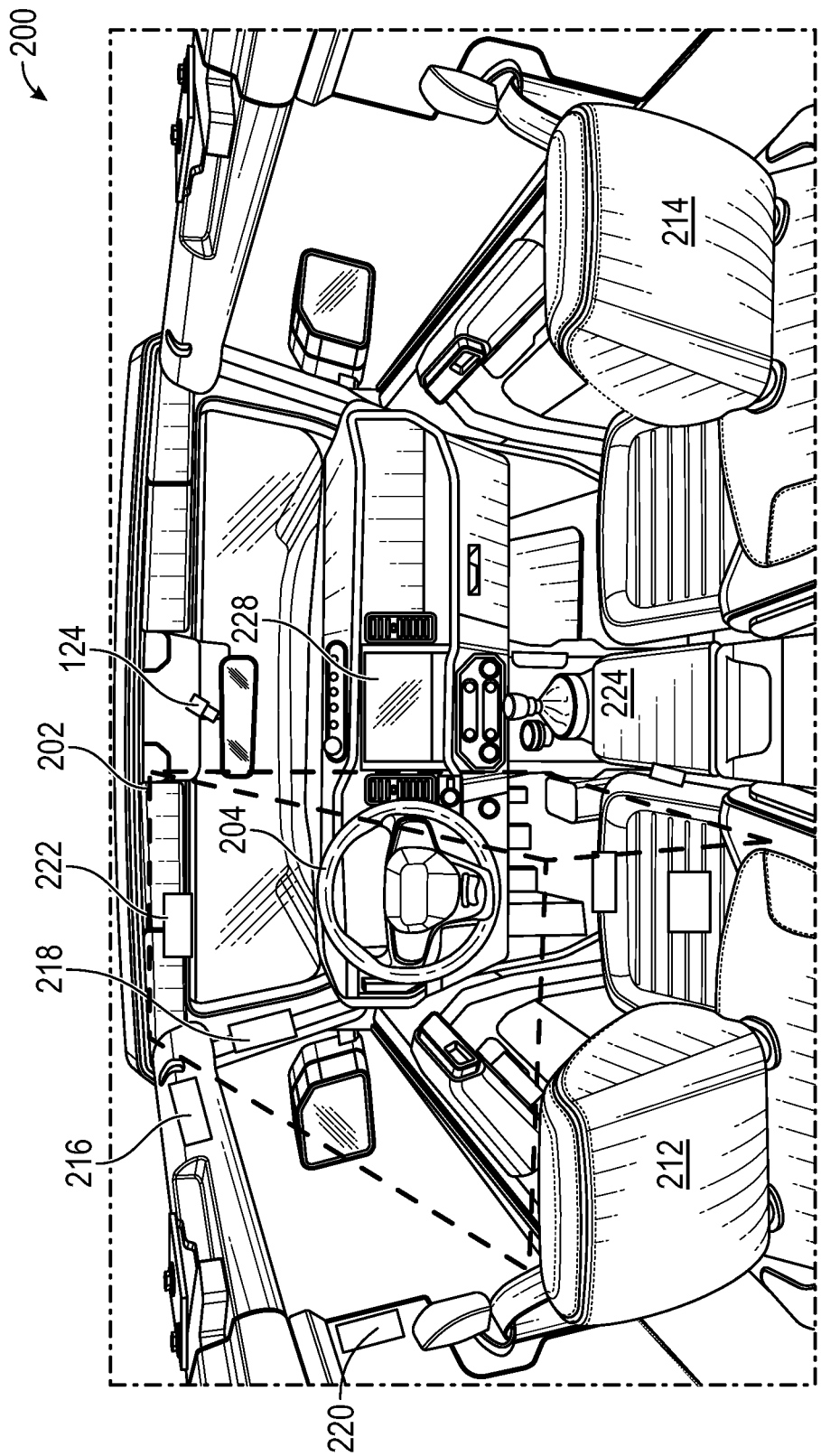
FIG. 2 is a perspective view of an example vehicle interior.

Generally, FIG. 2 illustrates an example interior 200 of the vehicle 102. FIGS. 1 and 2 will be referenced collectively in the following paragraphs. A sensing zone 202 can be configured as desired, but generally includes the area where the driver sits in front of a steering wheel 204. The steering wheel 204 is part of a primary driving interface that can also include objects on the steering column, as well as a gas pedal and brake pedal. The sensing zone 202 can include any area in the front of the vehicle 102 where the driver may be located during operation. In some instances, this can include the entire front area of the vehicle in front of both the driver's side seat 212 and the passenger's seat 214.

Portions of the sensor platform 110 may be integrated into various vehicle components. For example, a macro-capacitive sensor (MCS) can be integrated into a door panel location 216, an A-pillar location 218, a B-pillar location 220, a windshield header location 222, a center console location 224, and the like. The MCS can be integrated in the driver's side seat 212 (the seat pan/bottom, seat nose, and the seatback and/or headrest). The exact location of the MCS can vary according to design requirements.

A plurality of MCSs can be integrated into various vehicle components. In some instances, an MCS may be positioned in various location including, but not limited, to a seat bottom—driver's bottom, seatback—driver's back, seat nose—driver's legs, pedals—driver's feet/legs, a floor in front of a seat—driver's feet, dash lower close out panel—driver's feet/legs, center console side panel—driver's legs/hips/lower torso, door panel (if present)—driver's legs/hips/lower torso, steering wheel—driver's hands, A-Pillar—driver's hands, windshield header—driver's hands. In general, MCSs can be integrated into the vehicle interior or worn by the driver. In situations where the MCSs are worn by the driver, the MCSs can each be configured to communicate with the controller 108 over a short-range wireless connection, such as BLUETOOTH, Ultra-Wide Band (UWB) or near-field communications (NFC), as examples.

In some instances, the controller 108 can initiate a presence and position mode of operation when a driver gains access to the vehicle 102. When the driver is in a fully-seated position, the controller 108 can obtain sensor output from the sensor platform 110 and compute a baseline profile for the driver. In instances where the sensor platform includes MCS, the controller 108 can compute capacitive field values for a baseline profile. This baseline profile can also include detection and characterization of other objects in the sensing zone 202 as well, such as vehicle objects.

After the creation of the baseline profile, the controller 108 can determine the presence and position of the driver in real-time or near-real-time as the driver moves into and out of one or more sensor fields in the sensing zone 202. This allows the controller 108 to detect when the driver is in a not fully-seated position relative to the driver's side seat 212. When the driver has been determined to be in a not fully-seated position, the controller 108 can activate a non-seated drive mode. Alternatively, the non-seated drive mode can be activated when the driver utilizes the optional off-road mode actuator 116. For example, when the driver is operating the vehicle 102 in an off-road capacity, the driver can engage the non-seated drive mode by manipulation of the optional off-road mode actuator 116. The optional off-road mode actuator 116 can include a physical switch or button. Alternatively, the optional off-road mode actuator 116 can include a virtual switch or button provided on a human-machine interface 228 of the vehicle 102.

The controller 108 can activate a presence and position sensing mode based on indicators or vehicle driving modes, such as activation of trail mode. For example, when a driver has activated a trail mode of the vehicle, the controller 108 can automatically activate a mode of vehicle operation where driver position may be sensed, and corresponding adjustments in vehicle systems are effectuated. At the point of vehicle access by the driver, the controller 108 can activate the sensor platform 110 to sense for characteristic changes to the sensor fields.

Once the vehicle 102 is operational or running, the controller 108 may continue to examine the output of the sensor platform 110 for changes in signals (such as capacitive fields) indicating the driver has exited or otherwise shifted positions within the sensing zone 202. In instances where the sensor platform 110 includes a plurality of sensing elements, the controller 108 may determine when a foot and or leg of the driver has entered the sensing zone 202, accompanied by sensing a hand on the steering wheel 204, A-pillar 218, or both, and later followed by the lower torso, rear, back and another leg. To be sure, this is only an example scenario and is not intended to be limiting.

The controller 108 can determine when the driver shifts in their seat during the trip. In vehicles with trail control (a low-speed cruise control for off-road driving and rock crawling), a driver may inadvisably hunch or stand in the vehicle to see over a hood of the vehicle for avoidance or tight maneuvers through debris or obstructions. In one example use case, the controller 108 may determine driver movement or position shifting based on sensor platform 110 output. For example, the controller 108 may sense a change of driver position away from the pedals, seat bottom and lower seatback, and steering wheel and towards the pedal and floor, along with the seat nose (edge of seat bottom), upper steering wheel, and/or A-pillar, or windshield header.

The controller 108 may be configured to perform finer detections of driver movements and positions within the driver seating area through the placement of MCS arrays within the areas of interest. An MCS array can include any number of MCS elements arranged together or separately. In some instances, a single array can be used that includes a plurality of MCS elements. The directionality of each of the MCS elements can vary. For example, a portion of the MCS elements can be directed to above the seat bottom, a portion of the MCS elements can be directed to the seatback, a portion of the MCS elements can be directed to the seat headrest, and above. A portion of the MCS elements can be directed across and in front of the driver's seat 212.

When the sensor platform 110 includes arrays of macro capacitive sensors, such as multiple sensors across the driver's seat 212 such as the seat bottom, seat nose, seat-back, side of the center console, or around the steering wheel. In one example, MCSs elements can be spaced apart at a distance around the steering wheel 204, such as every 15 degrees. The controller 108 can utilize the output of these various MCSs elements of the sensor platform 110 to track driver movement and positional changes within the sensing zone 202 (such as the area around the driver's seat 212). The specificity and sensitivity of the sensor platform 110 are proportional to the size and number of sensor elements present.

It will be understood that once the controller 108 has obtained a baseline profile for the driver that is indicative of the driver being in a fully-seated position, the controller 108 can obtain in real-time or near-real-time, the output from the sensor platform 110 to determine capacitive field values. These real-time capacitive field values can be compared to the capacitive field values of the baseline profile. When discrepancies or changes are detected, the controller 108 can determine that the driver is not in a fully-seated position any longer. As noted above, depending on the number and placement of the MCSs of the sensor platform 110, the position of the driver can be determined with varying degrees of specificity. In a general case, the sensor platform 110 can determine only that the driver is in a not-full-seated position. As the granularity and specificity of the capacitive field data increases, more specific determinations of driver position changes can be determined, such as whether the driver is standing, crouching, kneeling, leaning, and the like.

In some instances, the controller 108 can be trained to identify not only that the driver's position has changed, but a likely posture of the driver (e.g., leaning, standing, crouching, kneeling). The controller 108 can implement machine learning (ML) or artificial intelligence (AI) that can be trained on capacitive field data that are indicative of various driver position(s). Likewise, the controller 108 can implement ML or AI that is trained to identify when the driver is in a fully-seated position as well.

When these changes in position are determined, corresponding changes to vehicle attributes or parameters may result. This may include the controller 108 selectively adjusting a vehicle function or vehicle system performance. For example, when the controller 108 determines that the driver is in a not-fully-seated position, the controller 108 can activate an off-road mode of operation for the vehicle where one or more vehicle operations or functions are selectively altered. For example, the controller 108 can cause damping of throttle response by transmitting signals to the electronic throttle control 112. Thus, when the driver pushes on the gas pedal, the throttle response by the electronic throttle control 112 can be limited. This can include limiting the acceleration profile and/or the speed profile of the vehicle 102. By way of example, regardless of how far the gas pedal is depressed (or how quickly it is depressed), the response by the electronic throttle control 112 can be limited. The response by the electronic throttle control 112 can be adjusted to ten percent (only an example and could be another value) compared with how the electronic throttle control 112 would respond if in a non-limited mode. The speed of the vehicle 102 can also be capped at, for example, three miles per hour.

Likewise, the controller 108 can cause damping of braking response by transmitting signals to the braking control 114. This may prevent the vehicle 102 from stopping abruptly when the brake pedal is used by the driver. Other vehicle functions can be modified such as a limit on vehicle speed when the vehicle is in declination/descent. For example, if the vehicle is descending a steep hill, the speed of the vehicle could be limited to a set value such as two miles per hour. Limitations on braking and throttle can prevent sudden acceleration or jerks that would otherwise be experienced by the driver.

In some instances, the controller 108 can adjust the drive-train control 117 to allow the driver to set engine torque to allow the vehicle 102 to overcome a boulder or small hill, but autobrake (controlled by the braking control 114) can be used to control speed during and after overcoming of the obstacle to keep the vehicle 102 moving smoothly and fluidly to prevent jarring movements.

As noted above, the controller 108 can enable predictive triggers based on sensor output. For example, the controller 108 can activate a vehicle sub-system to turn on a turn signal given that a driver's position indicates that the driver is sliding along a steering wheel. As noted above, another automated response can include the controller 108 activating a portion of the MCSs of the sensor platform 110, such as MCSs associated with a window header or A-pillar because the vehicle 102 is in trail mode and the controller 108 determines that the driver is moving forward or up in their seat. In sum, the controller 108 can selectively adjust or select which of a plurality of macro-capacitive sensors of the sensor platform 110 are being used based on the position of the driver. For example, when the driver is determined to be standing, the sensor platform 110 can select MCSs associated with the steering wheel, windshield header, and/or the A-pillar to detect changes in driver position that can be used to automate vehicle functions or operations.

The controller 108 can also automatically perform a key search when the vehicle 102 is in a secure idle mode and MCSs of the sensor platform 110 that are associated with the seat bottom have detected someone entering the vehicle even though the vehicle doors may have been removed. Yet another example includes instances where the controller 108 detects the driver moving up and out of a fully-seated position. The controller 108 can automatically turn off key searches for key modality, such as facial authentication that require the driver's face to be at a certain location. Additionally, this could also be done for Phone as a Key (PaaK) or Fob Based Passive Entry Passive Start (PEPS) devices, because the localization algorithm may detect the device (i.e., mobile phone or fob) as out of the vehicle if the driver has the mobile device or fob in a location such as a jacket or a shirt pocket or outside pocket during instances where the driver is standing or leaning out of the vehicle.

Additionally, given the presence and position detection features provided by the controller 108 (in some instances using macro capacitive sensors), it is possible to detect the driver's back alignment with respect to a seat back, angle to the seat back, and relative position of the driver's shoulders. Based on these parameters the controller 108 can be used to improve or enhance other features in the vehicle through the knowledge of these physical aspects of the driver. Thus, by knowing the location of the driver's shoulders and inferred position of their head, the controller 108 can provide coordinates to a vision-based system 122 indicating a location in an image frame the vision-based system 122 should look to find the driver's face. The vision-based system 122 can then determine (based on an image obtained from an optical sensor 124 such as a camera) if the driver's face is in or out of frame, allowing them to limit illumination, capture, and analysis of images. For example, the vision-based system 122 can determine if the driver was not visible in low power operation mode, such as a key-off application like vehicle start. In addition, this driver location/position information allows the vision-based system 122 to improve efficiency by limiting a zone of the image to analysis to find the driver's face.

In some instances, the optical sensor 124 can be placed into the vehicle such as a camera. Images from optical sensor 124 can be processed by the controller 108 to identify a driver's face and its position relative to a headrest of the driver's side seat 212. The output of the optical sensor 124 can be used to independently infer or determine a position of the driver. The output of the optical sensor 124 can be used to verify or confirm a position determination made by the controller 108 based on the output of the macro-capacitive sensor(s) of the sensor platform 110. The optical sensor 124 can also be used for driver state monitor, personalization and or wellness monitoring. Also, the output of the sensor platform 110 can be used to direct the optical sensor 124 to a location in the vehicle where the driver has been sensed. For example, if the driver is determined to be leaning across the center console, the optical sensor 124 can be instructed to locate the driver's face near the passenger's seat 214 rather than the driver's seat 212 as would be expected if the driver were in a fully-seated position.

FIG. 3 is a flowchart of an example method of the present disclosure. The method can include a step 302 of determining a presence of a driver in a sensing zone of a vehicle using a sensor platform integrated into the vehicle. For example, the driver can be sensed entering the vehicle and sitting in a driver's seat based on changes in capacitive fields of MCSs located in the vehicle.

In some instances, the presence of a driver can be determined after activating a presence and position feature of the vehicle. The activation of the presence and position feature can be based on sensing when the driver enters the vehicle using MCSs sensors. The activation of the presence and position feature can be based on determining when the vehicle is in an off-road mode (through driver activation). The activation of the presence and position feature can be based on determining when a roof of the vehicle has been removed. The activation of the presence and position feature can also be based on determining when an actuator for a non-seated drive mode has been activated.

Once the presence of the driver has been established, the method can include a step 304 of determining a baseline profile for the driver where the baseline profile is indicative of the driver in a fully-seated position. In some instances, the baseline profile is generated in advance and stored for later use. For example, a training mode can be used to establish a baseline profile for the driver when the driver purchases the vehicle. In other instances, a baseline profile can be generated each time the driver enters the vehicle.

Next, the method can include a step 306 of determining when the position of the driver indicates that the driver is not in a fully-seated position relative to a driver's seat of the vehicle. In some instances, this can include detecting changes in capacitive fields relative to the baseline profile.

The method can include a step 308 of selectively adjusting a vehicle parameter of the vehicle based on the driver not being in a fully-seated position. For example, a throttle and/or braking response may be damped in response to determining that the driver is not in a fully-seated position and is operating the vehicle. Non-limiting example responses can include damping a braking response of the vehicle, damping a throttle response of the vehicle, and/or slowing the vehicle when the vehicle is in descent.

The method can also include a step 310 of verifying the presence and the position of the driver using an optical sensor within the vehicle. For example, if the driver is determined to be in a not-fully seated position based on output of MCSs, the optical sensor can be activated to verify an actual, current position of the driver. Also, the output of the MCSs can be used to direct operations of a vision-based system, as disclosed above.

FIG. 4 is a flowchart of an example method for determining when the position of the driver indicates that the driver is not in the fully-seated position. The method can include a step 402 of determining a baseline seating profile of the driver in the driver's seat using output of the sensor platform. This can include instructing a driver to assume a fully seated position through a human-machine interface of the vehicle. The driver is then scanned using MCSs to create the baseline profile. The baseline profile is created from capacitive field output of the MCSs.

Next, the method includes a step 404 of comparing a current position of the user to the baseline seating profile of the driver in the driver's seat. The method can also include a step 406 of determining that the user is not in the fully-seated position when the comparison indicates that the driver is in any of one or more of leaning, kneeling, lifted off of the driver's seat, and standing. Again, these are examples of changes in position and are not intended to be limiting.

The method can include a step 408 of selectively adjusting a vehicle parameter based on a predictive trigger, where the predictive trigger is activated based on a detected change in a driver's position. For example, a predictive trigger can include activating a turn signal when a change in driver position indicates that the driver is sliding to the left or right while they are in a not-fully-seated position.

Figure 5:
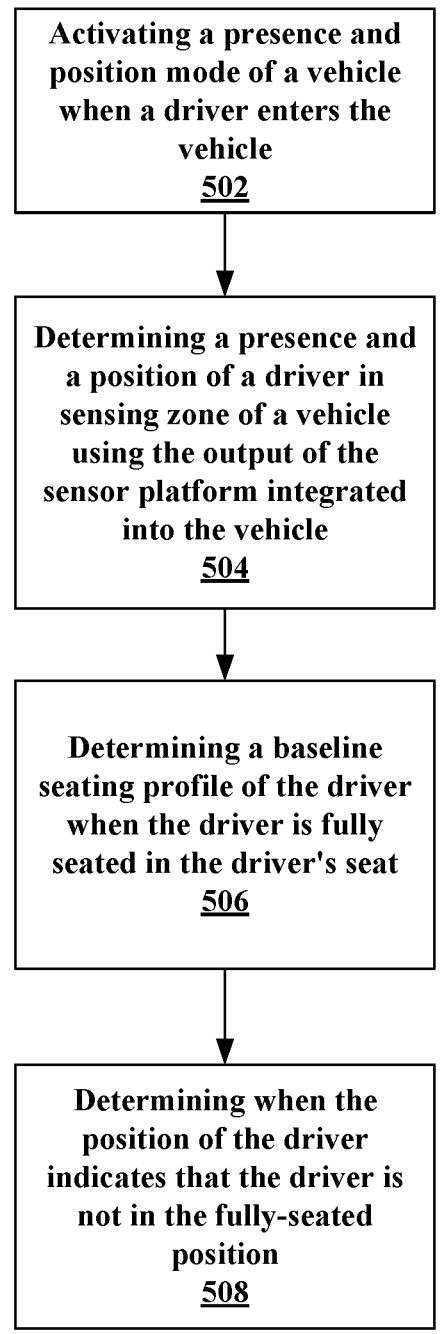
FIG. 5 is a flowchart of another example method of the present disclosure for driver presence and position detection.

FIG. 5 is a flowchart of another example method. The method can include a step 502 of activating a presence and position mode of a vehicle when a driver enters the vehicle. The method can also include a step 504 of determining a presence and a position of a driver in a sensing zone of a vehicle using the output of the sensor platform integrated into the vehicle. It will be understood that the sensor platform comprises a macro-capacitive sensor integrated into a driver's seat or a vehicle structural component of the vehicle. Next, the method can include a step 506 of determining a baseline seating profile of the driver when the driver is fully seated in the driver's seat, as well as a step 508 of determining when the position of the driver indicates that the driver is not in the fully-seated position.

Figure 6:
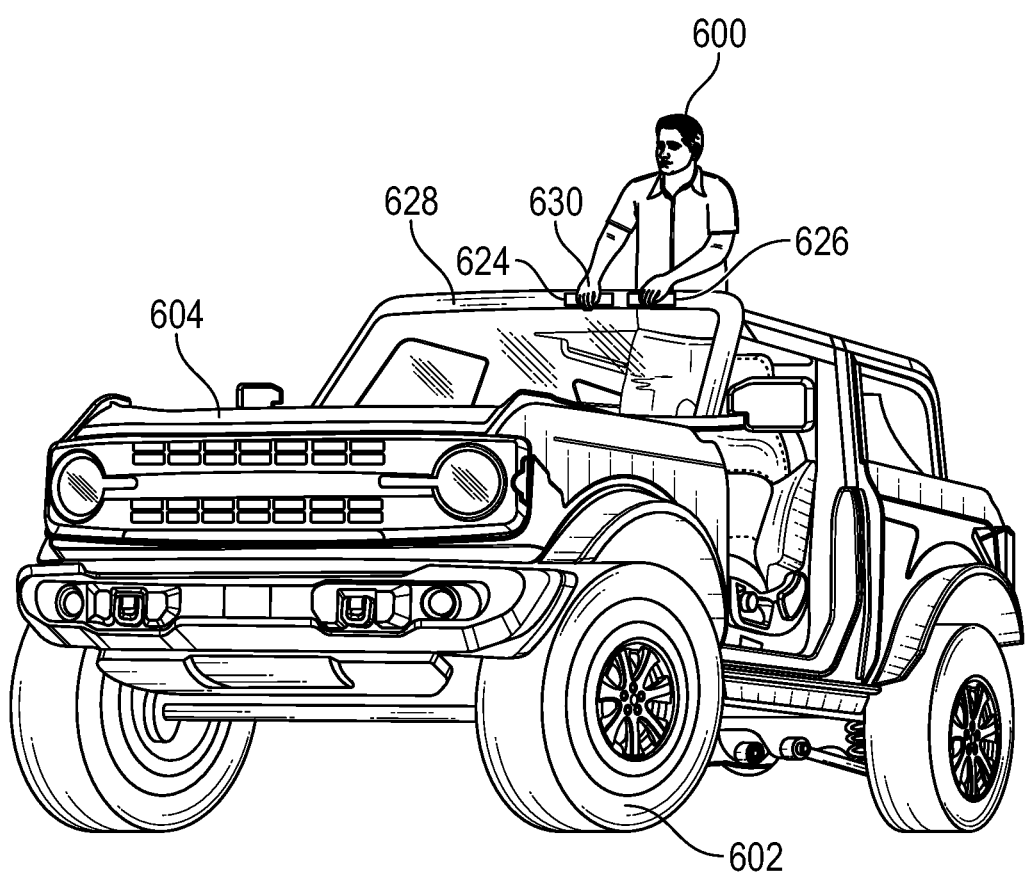
FIG. 6 is a perspective view of an example vehicle exterior that includes a secondary driving interface.

Referring now to FIG. 6, as noted above, a normal driver seated position (e.g., fully seated) may not provide a driver 600 with the most effective view of the road or terrain 602 necessary for optimal safe operation of the vehicle 604. In some instances, the driver 600 may rise off the seat, kneel on the seat, or even stand up to see the terrain around the vehicle while preforming tight or technical maneuvers. In FIG. 6, the driver 600 is illustrated as standing in the vehicle 604, but this position is not intended to be limiting but only an example.

Figure 7:
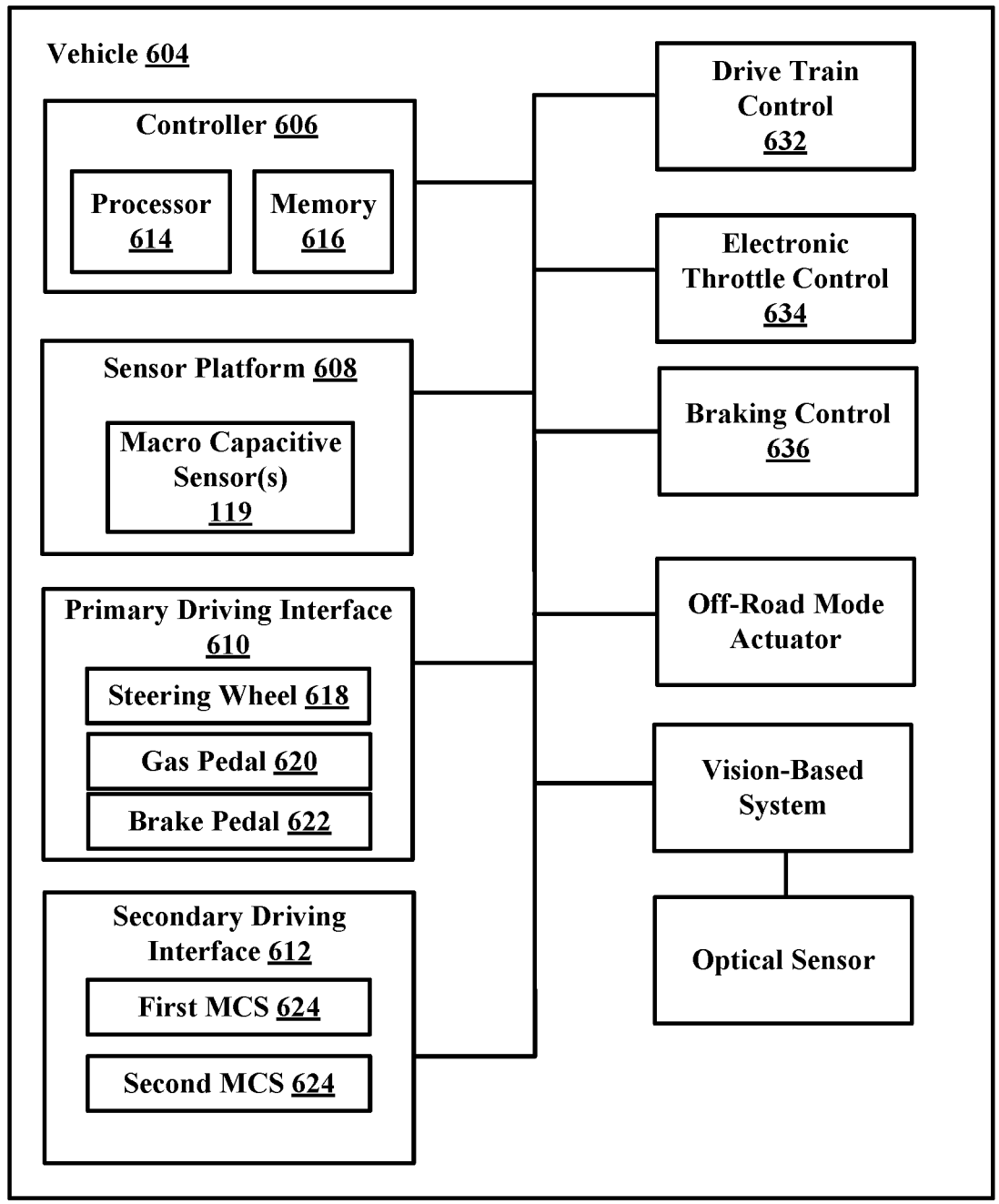
FIG. 7 is a schematic diagram of another example controller.

FIG. 7 illustrates an example schematic diagram of the vehicle 604. The vehicle 604 comprises a controller 606, a sensor platform 608, a primary driving interface 610, and a secondary driving interface 612. In general, the controller 606 comprises a processor 614 and memory 616 that stores instructions. While these elements are disclosed, the vehicle 604 can include any or all of the elements of the vehicle 102 of FIG. 1, such as the off-road mode actuator, the vision-based system, and the optical sensor.

The processor 614 executes instructions in the memory 616 to perform methods disclosed herein. In some instances, the controller 606 can be configured to implement any of the driver presence and position detection methods disclosed above, and additionally methods related to vehicle mode selection. The controller 606 may be further configured to provide secondary driving interface controls to the driver of the vehicle that can incorporate driver presence and position detection, as well as vehicle drive mode. The sensor platform 608 can include any of the disclosed sensor platform capabilities related to driver presence and position detection as described above. In one example, the controller 606 can activate the secondary driving interface 612 when the vehicle 604 control system has determined that the driver is in a not-fully-seated position and/or the vehicle is in an off-road mode (could be through selection of a button or actuator or based on when a user removes a roof panel or door of the vehicle). The secondary driving interface 612 could also be activated based only on the presence and/or position of the driver, such as when the driver is operating the vehicle in a not-fully-seated position.

It will be understood that in special cases, like off-road driving, rock crawling, or other cases of technical vehicle maneuvering, having controls other than the steering wheel and/or standard pedal controls (such as gas and brake) for the vehicle brake and accelerator may assist the driver 600 keep the vehicle 604 under control.

The primary driving interface 610 can include a steering wheel 618, a gas pedal 620, and a brake pedal 622. The controller 606 can receive driver input from any component of the primary driving interface 610 and translate such driver input into controlling signals based on driver presence and position. In some instances, the controller 606 can activate the secondary driving interface 612 based on sensor platform 608 output. For example, when the driver is in a not-fully-seated position (based on sensor output obtained from the sensor platform 608), the controller 606 can activate the secondary driving interface 612 allowing some or all vehicle controls such as speed, acceleration, braking, steering, and the like to be controlled independently (or co-dependently) from the primary driving interface 610.

In general, the secondary driving interface 612 may not be the primary control method for controlling the vehicle; the secondary driving interface may be limited to special operating modes and or conditions. Limitations can include a limited set of vehicle functions. For example, the driver may only be allowed to modify vehicle speed and/or torque. Limitations can also refer to limitations related to one or more vehicle functions. For example, control of vehicle speed can be limited to only small incremental changes in velocity. Another example includes allowing a driver to control torque applied to the wheels of the vehicle. Again, these are intended as examples only and are not intended to be limiting. An example velocity threshold or range can include one mile per hour, or two miles per hour+/−0.5 miles per hour, respectively. In some instances, the driver may be moving through and obstacle such a boulder filled wash bed where they have observed other off-road getting stuck or sinking into a soft bank after clearing the last boulder. The driver may choice to increase the speed of the vehicle to limit or preventing this on their exist from traversing the boulder obstacle. With respect to torque, the driver may find that one particular boulder that must be traverse request additional torque to allow the vehicle to climb at a steeper angle over it than is required or comfortable for the rest of that section of trail, thus the secondary control could allow the driver to increase the torque to the vehicle's wheel to overcome that one obstacle. Additionally, the driver can reduce the torque the vehicle is outputting after achieving that obstacle.

Referring to FIGS. 6 and 7 collectively, the secondary driving interface 612 can include a first MCS 624 and a second MCS 626. For example, the first MCS 624 can be used to increase a speed/torque of the wheels of the vehicle. The second MCS 626 can be used to decrease a speed/torque of the wheels of the vehicle. In another example, the first MCS 624 can be used to increase and/or decrease a speed/torque of the wheels of the vehicle, while the second MCS 626 can be used to control vehicle steering. In some instances, one large MCS can be utilized. Additionally, more than two MCSs can be used and assigned vehicle control functions. Again, while MCSs are disclosed, other suitable sensors can be utilized.

In one example, the first MCS 624 and the second MCS 626 are associated with a windshield header or frame 628. Sensors located on surfaces on the windshield header or frame of the vehicle may only be accessible in a roof-off vehicle configuration. In general, an MCS can be placed in a position where a hand 630 of the driver 600 can interact with the sensor and through the use of gross (large or non-finite) gesture-based input, such as hand sweeps, across a sensor. These hand sweeps allow the driver to increase, decrease, or stop a vehicle while in the vehicle is in a special operational mode (such as "Trail Control"). By tying this special set of controls to specific operational modes of the vehicle, it insures the driver may not inadvertently activate them during normal "On Road" operation.

In an example use case, the driver 600 can place or hover their hand 630 over one of the sensors, requesting the controller 606 to increase the vehicle speed or torque accordingly (through vehicle sub-systems such as drive train control 632, engine/electronic throttle control 634, and/or braking control 636).

To maintain safety, the controller 606 can increment speed or torque at a metered pace to ensure the vehicle would not lurch, accelerate rapidly given an operator's input. On the corollary, the second MCS 626 could be used reduce a speed of the vehicle or reduce torque to wheels in order to bring the vehicle to stop or disengage the operating mode of the vehicle. The controller 606 may be configured to hold the brakes until the vehicle can be shifted into park or the driver reengages the vehicle mode or take control in some other way. The controller 606 can be governed with respect to acceleration to limit or avoid sudden jerks, accelerations or decelerations of the vehicle. In another example, the first MCS 624 could be configured as a presence management or intent switch (hand on active, hand of deactivated), while the second MCS 626 is used to change the speed of the vehicle. For example, a left swipe decreases speed or torque and a right sweep increases speed or torque.

While MCS sensors have been disclosed as being associated with the windshield header or frame 628 of the vehicle 604, the MCS sensors of the secondary driving interface 612 can be located inside the vehicle's cockpit/interior. For example, MCS sensor can be mounted to an upper side of the dashboard, around a perimeter of the steering wheel, and/or on a vehicle structural member such as an A-pillar, B-Pillar, and/or window frame—just to name a few. In some instances, some of the MCSs used in the sensor platform 608 can be reconfigured as the secondary driving interface. That is, once a special vehicle mode has been activated, such as when a driver is determined to be in a not-fully-seated position, a portion of the sensors that were used to determine driver presence and/or position can be reconfigured by the controller 606 to receive driver input to control the vehicle. In one example, the controller 606 can activate the secondary driving interface 612 of the vehicle when the driver is not in a fully-seated position and the vehicle is in the selected driving mode. The location of the MCS sensors can be adjusted as desired. In some instances, the MCS sensors can be selectively moved around the vehicle to suit the preferences of the driver. In one example, additional, redundant MCS sensors can be arranged on a passenger side of the vehicle, as well as (or in lieu of) those present on the driver's side. In this way, two occupants can manage vehicle controls together. For example, one occupant may be allowed to adjust speed, while a second occupant can adjust torque or another vehicle operating parameter.

In another example, an MCS array could be used to selectively adjust both acceleration and or brake pressure of the vehicle. In this instance the MCS array could track the hand location of the driver on the accelerator sensor (such as the first MCS 624) set to adjust the vehicle speed while in the special mode. The controller 606 can then allow the vehicle to be allowed to accelerate up to a capped speed or reduce speed to a crawl without engaging the brakes. A braking sensor (such as the second MCS 626) could be used in a similar way to set brake pressure to maintain vehicle location, preventing it from back sliding, while not over burdening the engine. In either case the controller 606 may hold the output level chosen until the speed or braking is increased or decreased to the set cap or until forward motion is stopped. The special mode may be disabled by the driver as needed.

In another example, a single MCS (such as the first MCS 624) could be used as a user intent switch. For example, once a special mode is engaged, the controller 606 may only allow the vehicle to operate if it detects the driver is present in the seated position or if it detects the driver's hand as present on the first MCS 624 or holding on to the first MCS 624. In the case where the driver is lost or no longer detected based on the output of the sensor platform 608, the driver has been detected leaving their seated position, and or the driver's hand was not determine to be present on the first MCS 624, the controller 606 can cause the vehicle to activate a safe state by slowing forward motion to a stop while holding its position, preventing back slide or sudden movement, by engaging the brakes on without disabling the mode.

Upon re-engagement by the driver through detection either at the first MCS 624 or back in the driver's seat, the special mode could be reactivated by the controller 606. In yet another example, MCS sensors could be placed on another surface of the vehicle, such as the instrument panel, A-pillar, door header, and so forth (e.g., wherever it is convenient for the driver to access them while operating the vehicle in the specific special mode). In some use cases, the driver may wish to use their outside hand for stabilization during operation and control of the secondary vehicle controls. Additionally, the driver may have a preference, left handed versus right handed, and find it more convenient to swap the side the controls are on for better and safer control of the vehicle while in this mode.

In some instances, the controller 606 can detect rain or other situations where moisture may be present with respect to the MCSs. For example, the controller 606 could receive signals from a rain sensor or module associated with an automatic windshield wiper system to detect the presence of rain. Rain may interfere with operations of MCSs (e.g., preventing or deleteriously affecting detection of capacitive fields). Therefore, when rain is detected, the controller 606 can deactivate use and/or control of the vehicle using MCSs.

The user could be prompted by visual or audio output to return to a fully-seated position in order to drive the vehicle.

Figure 8:
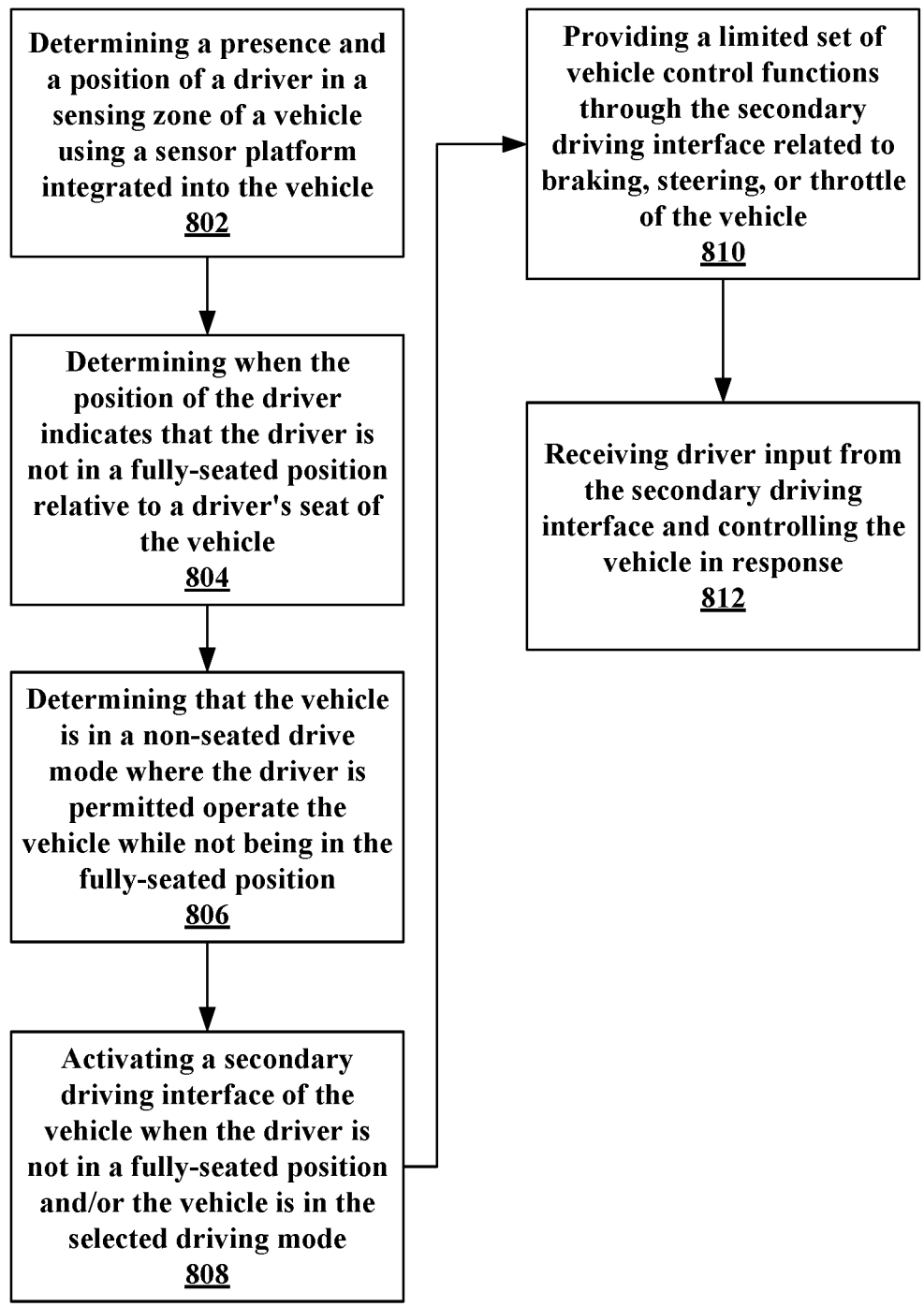
FIG. 8 is a flowchart of an example method of the present disclosure.

FIG. 8 is a flowchart of an example method of the present disclosure. The method can include a step 802 of determining a presence and a position of a driver in a sensing zone of a vehicle using a sensor platform integrated into the vehicle. It will be understood that the sensing zone is associated with a primary driving interface of the vehicle, such as the steering wheel and/or gas and brake pedals.

The method can include a step 804 of determining when the position of the driver indicates that the driver is not in a fully-seated position relative to a driver's seat of the vehicle. As noted above, this can include comparing a baseline profile of the driver in a fully seated position to the output of the sensor platform (e.g., one or more MCSs). As noted above, the MCSs output capacitive field data can be interpreted by a controller. The controller can compare real-time capacitive field data to the baseline profile to detect (1) presence of a driver in general, and more specifically (2) a position of the driver whether that be kneeling, standing, partially sitting, and the like.

The method can also include a step 806 of determining that the vehicle is in a non-seated drive mode where the driver is permitted to operate the vehicle while not being in the fully-seated position. When either or both of these conditions are met, the method can include a step 808 of activating a secondary driving interface of the vehicle when the driver is not in a fully-seated position and/or the vehicle is in the selected driving mode.

The method can include a step 810 of providing a limited set of vehicle control functions through the secondary driving interface related to braking, steering, or throttle of the vehicle. In some instances, the secondary driving interface is a gesture-based control system. For example, the secondary driving interface can include a MCS that senses changes in capacitive fields to determine movement/gestures of the driver.

The method can further include a step 812 of receiving driver input from the secondary driving interface and controlling the vehicle in response. This can include accelerating or slowing the vehicle. By way of example, this can include receiving continuous input from a hand of a user by a macro-capacitive sensor that is configured to work as a user intent switch. As noted above, when the hand of the user is no longer sensed forward motion of the vehicle is slowed to a stop, and a stopped position of the vehicle is maintained.

In some instances the secondary driving interface can be used to steer the vehicle. In some instances, the secondary driving interface comprises macro-capacitive sensors, with a first portion of the macro-capacitive sensors being integrated into a windshield frame of the vehicle. In other instances, driver input can be received from a second portion of a macro-capacitive sensor that is integrated into an A-pillar of the vehicle.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general purpose computer, special purpose computer, or special purpose processing device to perform a certain function or group of functions. An implementation of the devices, systems, and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
    determining a presence and a position of a driver in a sensing zone of a vehicle using a sensor platform integrated into the vehicle, the sensing zone comprising a primary driving interface of the vehicle;
    determining when the position of the driver indicates that the driver is not in a fully-seated position relative to a driver's seat of the vehicle, and that the vehicle is in a non-seated drive mode where the driver is permitted to operate the vehicle while not being in the fully-seated position;
    activating a secondary driving interface of the vehicle when the driver is not in the fully-seated position and the vehicle is in the selected driving mode; and
    slowing the vehicle when the vehicle is in descent and the secondary driving interface is active.

2. The method according to claim 1, further comprising providing a limited set of vehicle control functions through the secondary driving interface related to braking, steering, or throttle of the vehicle, the secondary driving interface being a gesture-based control system.

3. The method according to claim 1, further comprising receiving driver input from the secondary driving interface that comprises macro-capacitive sensors, with a first portion of the macro-capacitive sensors being integrated into a windshield frame of the vehicle.

4. The method according to claim 1, further comprising receiving driver input from a second portion of a macro-capacitive sensor that is integrated into an A-pillar of the vehicle.

5. The method according to claim 1, further comprising receiving continuous input from a hand of a user by a macro-capacitive sensor that is configured to work as a user intent switch, wherein when the hand of the user is no longer sensed, forward motion of the vehicle is slowed to a stop, and a stopped position of the vehicle is maintained.

6. The method according to claim 1, wherein the sensor platform comprises a macro-capacitive sensor integrated into any one or more of the driver's seat, a vehicle structural component, the macro-capacitive sensor being configured to:
  detect changes in capacitive fields to determine the presence and the position of the driver in the sensing zone, and combinations thereof; and
  selectively adjust which of the macro-capacitive sensors to activate based on the position of the driver.

7. The method according to claim 1, further comprising verifying the presence and the position of the driver using an optical sensor within the vehicle.

8. The method according to claim 1, further comprising receiving driver input from the secondary driving interface to:
  selectively adjust a velocity of the vehicle;
  selectively adjust braking of the vehicle; and
  deactivate the secondary driving interface.

9. The method according to claim 8, wherein selectively adjusting the velocity of the vehicle includes damping a throttle response of the vehicle.

10. The method according to claim 8, wherein selectively adjusting braking of the vehicle includes damping a braking response of the vehicle.

11. The method according to claim 1, wherein determining the presence and the position of the driver occurs after activating a presence and position feature of the vehicle, the presence and position feature being activated based on any one or more of:
  sensing when the driver enters the vehicle;
  determining when the vehicle is in an off-road mode;
  determining when a roof or a door of the vehicle has been removed; and
  determining when an actuator has been activated.

12. A system, comprising:
  a primary driving interface;
  a secondary driving interface; and
  a controller comprising a processor and memory for storing executable instructions, the processor executing the instructions to:
  determine a presence and a position of a driver in a sensing zone of a vehicle using a sensor platform integrated into the vehicle, the sensing zone including the primary driving interface;
  determine when the position of the driver indicates that the driver is not in a fully-seated position relative to a driver's seat of the vehicle, and that the vehicle is in a non-seated drive mode in which the driver is permitted to operate the vehicle while not being in the fully-seated position; and
  activate a secondary driving interface of the vehicle when the driver is not in the fully-seated position and the vehicle is in the selected driving mode,
  wherein the secondary driving interface comprises a macro-capacitive sensor that receives continuous input from a hand of a user, the macro-capacitive sensor being configured to work as a user intent switch, wherein when the hand of the user is no longer sensed, forward motion of the vehicle is slowed to a stop, and a stopped position of the vehicle is maintained.

13. The system according to claim 12, wherein the secondary driving interface is integrated into a windshield frame of the vehicle.

14. The system according to claim 12, further comprising providing a limited set of vehicle control functions through the secondary driving interface related to braking, steering, or throttle of the vehicle, the secondary driving interface being a gesture-based control system.

15. The system according to claim 12, wherein the controller determines when the position of the driver indicates that the driver is not in a fully-seated position by:
  determining a baseline seating profile of the driver in the driver's seat;
  comparing a current position of a user to the baseline seating profile of the driver in the driver's seat; and
  determining that the user is not in the fully-seated position when the comparison indicates that the driver is any one or more of leaning, kneeling, lifted up off of the driver's seat, and standing.

16. The system according to claim 12, wherein the processor further executes the instructions to slow the vehicle when the vehicle is in descent and the secondary driving interface is active.

17. A device, comprising:
  a processor; and
  a memory for storing executable instructions, the processor executing the instructions to:
  determine a presence and a position of a driver in sensing zone of a vehicle using a sensor platform integrated into the vehicle, the sensing zone including a primary driving interface;
  determine when the position of the driver indicates that the driver is not in a fully-seated position relative to a driver's seat of the vehicle, and that the vehicle is in a non-seated drive mode in which the driver is permitted to operate the vehicle while not being in the fully-seated position; and
  activate a secondary driving interface of the vehicle when the driver is not in the fully-seated position and the vehicle is in the selected driving mode, wherein the secondary driving interface comprises a macro-capacitive sensor that receives continuous input from a hand of a user, the macro-capacitive sensor being configured to work as a user intent switch, wherein when the hand of the user is no longer sensed, forward motion of the vehicle is slowed to a stop, and a stopped position of the vehicle is maintained.

18. The device according to claim 17, wherein the processor is configured to determine when the vehicle is in a non-seated drive mode where the driver is permitted to operate the vehicle while not being in the fully-seated position prior to activating a secondary driving interface.

19. The device according to claim 17, wherein the secondary driving interface provides a limited set of vehicle control functions related to braking, steering, or throttle of the vehicle, the secondary driving interface being a gesture-based control system.

20. The device according to claim 17, wherein the processor further executes the instructions to slow the vehicle when the vehicle is in descent and the secondary driving interface is active.

* * * * *